Nov. 14, 1939.   A. L. FRY   2,179,549
PUSH-OFF FOR SWEEP RAKES
Filed May 3, 1938
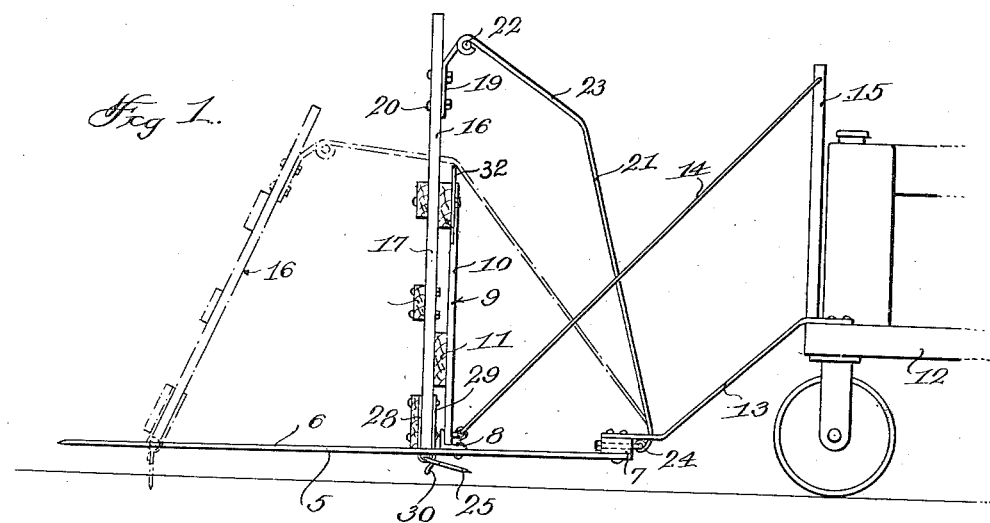
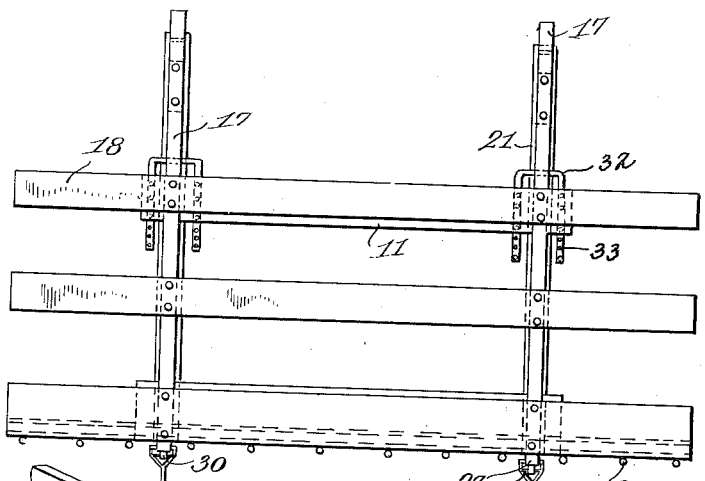
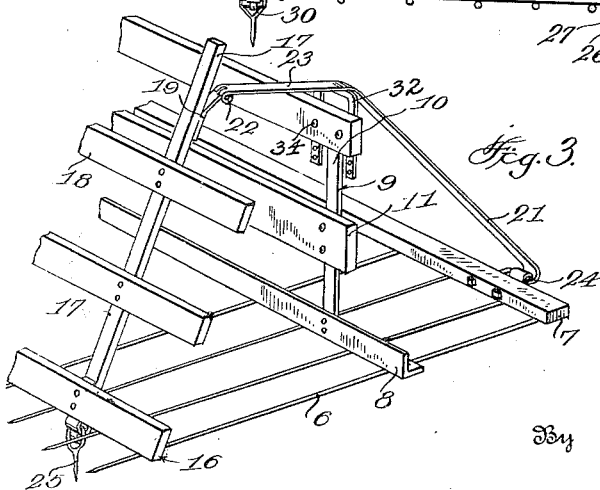
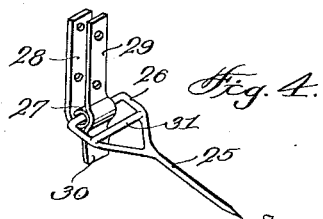
Inventor
Alva L. Fry
By Ralph Burch
Attorney Patented Nov. 14, 1939

2,179,549

UNITED STATES PATENT OFFICE 2,179,549

PUSH-OFF FOR SWEEP RAKES

Alva L. Fry, North Platte, Nebr.

Application May 3, 1938, Serial No. 205,803

1 Claim. (Cl. 56—395)

This invention relates to an improved push-off for sweep rakes and has for its object to provide a push-off which will automatically discharge the load of the sweep rake upon backward movement of the rake.

A further object of the invention resides in providing a device of the above-mentioned character which is simple and durable in construction, reliable and efficient in operation and inexpensive to manufacture.

Other objects and advantages of the invention will be apparent during the course of the following description.

In the accompanying drawing, forming a part of this specification and in which like numerals are employed to designate like parts throughout the same, Fig. 1 is a side elevation of a sweep rake with the push off applied thereto, Fig. 2 is a front elevation of the same, Fig. 3 is a fragmentary perspective view, and, Fig. 4 is a detail perspective view of one of the ground engaging spikes.

In the drawing, wherein for the purpose of illustration I have shown a preferred embodiment of my invention, the numeral 5 denotes generally a sweep rake composed of a series of spaced teeth 6 connected at one end to a cross beam 7 and extending across the teeth at a point intermediate their ends is an angle bar 8 which supports the vertical barrier 9 composed of the uprights 10 and cross-boards 11. The sweep rake is adapted to be mounted on the front end of a tractor 12 or other suitable vehicle in spaced relation to the ground and one means of attaching the rake to a tractor is shown in Fig. 1 consisting of a hanger 13 attached to the cross beam 7 of the rake and frame of the tractor, with brace rods 14 extending from the angle bar 8 to the uprights 15 mounted on the front of the tractor.

The push-off frame 16 consists of a pair of uprights 17 on which are mounted a series of spaced cross bars 18. The frame 16 is disposed forward of the barrier 9 with the lower edge resting on the teeth 6 of the sweep rake and the upper ends of the uprights 17 extend above the top of the barrier. A hinge plate 19 is attached by bolts 20 to the upper ends of the uprights 17 which connect with the upper ends of the supporting arms 21 by means of pintle pins 2. The upper ends of the supporting arms 21 are bent forwardly at an angle, as at 23, and the lower ends of the supporting arms are pivotally connected to the U-bolts 24 secured in the cross beam 7 of the sweep rake, thus permitting the push-off frame 16 to move forwardly along the teeth of the sweep rake until the supporting arms contact with the upper edge of the barrier 9. Ground engaging spikes 25 are pivotally suspended from the lower ends of the uprights 17 of the push-off frame 16, the spikes being formed with eyes 26 which are journaled in loops 27 formed at the lower ends of the metal straps 28 attached to the lower ends of the uprights 17. Secured to the uprights 17 in opposed relation to the straps 28 are straps 29 which extend beyond the loops 27, with their free ends 30 disposed in the path of movement of the cross bar 31 in the eyelets 26, whereby the movement of the spikes 25 are limited in one direction. The spikes 25 hang below the teeth of the sweep rake and are free to swing rearwardly when the push-off is moved forwardly with the sweep rake but when the sweep rake is moved rearwardly the spikes dig into the ground and hold the push-off stationary which discharges the load from the sweep rake.

Attached to the upper cross-board 11, of the barrier 9, at the point of contact between the arms 21 and the crossboard, are U-shaped bars 32 which are provided with a series of openings 33 in their legs to receive bolts 34, for adjustably connecting the bars to the cross-board, to permit vertical adjustment of the bars to regulate the forward movement of the push-off frame.

In operation, the sweep rake moves forwardly over the ground to collect the load and during the forward movement of the rake the push-off frame 16 is disposed against the barrier 9 of the rake. When it is desired to discharge the load, the movement of the sweep rake is reversed, but the push-off frame remains stationary by reason of the spikes 25 digging into the ground, whereby the push-off frame discharges the load from the rake. Forward movement of the push-off frame is limited by the supporting arms 21 engaging with the bars 32 fastened to the upper edge of the barrier 9 and after the load is discharged the sweep rake again moves forwardly which returns the push-off frame against the barrier.

It is to be understood that the form of my inventin herein shown and described is to be taken as a preferred example of the same and that certain changes in the shape, size and arrangement of the parts may be made without departing from the spirit of the invention or the scope of the subjoined claim.

Having thus described my invention, I claim:

In a push-off for sweep rakes, the combination of a rake frame having a series of horizontal teeth, a vertical barrier mounted intermediate the length of said frame, a push-off frame disposed forwardly of said barrier, supporting arms pivotally attached at one end to the rear end of said rake frame, said arms extending upwardly and over the upper edge of said barrier, means pivotally connecting the forward ends of said arms to the upper edge of said push-off frame, ground engaging elements depending from the lower edge of said push-off frame, and vertically adjustable contact bars mounted on the upper edge of said barrier in the path of movement of said arms for limiting the movement of said supporting arms to control the distance of travel of said push-off frame towards the forward end of said rake frame.

ALVA L. FRY.